United States Patent [19]
Nishii et al.

[11] Patent Number: 5,631,070
[45] Date of Patent: May 20, 1997

[54] POLYAMIDE RESIN COMPOSITION AND HOUSING FOR ELECTRONIC EQUIPMENT

[75] Inventors: Kota Nishii; Kouichi Kimura; Masanobu Ishizuka; Katsura Adachi, all of Kawasaki, Japan

[73] Assignee: Fujitsu Limited, Kawasaki, Japan

[21] Appl. No.: 478,665

[22] Filed: Jun. 7, 1995

Related U.S. Application Data

[62] Division of Ser. No. 111,480, Aug. 25, 1993, Pat. No. 5,470,909.

[30] Foreign Application Priority Data

Feb. 18, 1993 [JP] Japan ................................. 5-029328

[51] Int. Cl.$^6$ ................................................ B32B 33/00
[52] U.S. Cl. ............................................. 428/220; 525/391
[58] Field of Search ................................................ 428/220

[56] References Cited

U.S. PATENT DOCUMENTS

| | | |
|---|---|---|
| 4,438,236 | 3/1984 | Cogswell et al. . |
| 4,798,865 | 1/1989 | Grant et al. . |
| 4,859,739 | 8/1989 | Yates, III et al. . |
| 5,006,403 | 4/1991 | Isayev . |
| 5,254,304 | 10/1993 | Adachi et al. . |
| 5,260,380 | 11/1993 | Isayev . |
| 5,310,776 | 5/1994 | Takagi et al. ............... 524/474 |
| 5,360,866 | 11/1994 | Arashiro et al. ............ 525/68 |

FOREIGN PATENT DOCUMENTS

| | | |
|---|---|---|
| 438128 | 7/1991 | European Pat. Off. . |
| 56-115357 | 9/1981 | Japan . |
| 3-215548 | 9/1991 | Japan . |
| 4-151222 | 5/1992 | Japan . |
| 4-154864 | 5/1992 | Japan . |
| 5-112714 | 5/1993 | Japan . |
| 7941364 | 11/1979 | United Kingdom . |
| 7941365 | 11/1979 | United Kingdom . |

OTHER PUBLICATIONS

G. Kiss, *Polymer Engineering and Science*, vol. 27, No. 6, pp. 410–423, Mar. 1987, Summit, New Jersey.

T. Chung, *Plastics Engineering*, pp. 39–41, Oct. 1987, Summit, New Jersey.

*Primary Examiner*—Ana Woodward
*Attorney, Agent, or Firm*—Armstrong, Westerman, Hattori, McLeland & Naughton

[57] ABSTRACT

A polyamide resin composition including 100 parts by weight of a resin composition containing of 20 to 80% by weight of an aromatic polyamide resin and 80 to 20% by weight of a modified polyphenylene ether resin (the total amount in% by weight of the aromatic polyamide resin and the modified polyphenylene ether resin being 100% by weight) and, incorporated in the resin composition, 0.5 to 30 parts by weight of a liquid-crystalline polymer, 0.01 to 3 parts by weight of a compatibilizing agent and 2 to 40 parts by weight of an inorganic filler and optionally a rubber component. The plate thickness of the resin molded articles may be reduced to 2 mm or less, and even further to 1 mm or less without deterioration of the properties thereof.

7 Claims, 6 Drawing Sheets

EXAMPLE OF MEASUREMENT OF WARPAGE

Fig.4

POLYAMIDE RESIN COMPOSITION AND HOUSING FOR ELECTRONIC EQUIPMENT

This is a division of application Ser. No. 08/111,480 filed Aug. 25, 1993, now U.S. Pat. No. 5,470,909.

BACKGROUND OF THE INVENTION

1. Field of the Invention

The present invention relates to a polyamide resin composition comprising an aromatic polyamide resin, a modified polyphenylene ether resin, a liquid-crystalline polymer, a compatibilizing agent and, as an inorganic filler, a carbon fiber, mica, glass flake or the like. More particularly, the present invention is concerned with a polyamide resin composition excellent in water resistance, chemical resistance, mechanical properties, fluidity during molding and rigidity and less liable to cause warpage, and a lightweight housing for electronic equipment, such as personal computers and word processors, produced by molding the polyamide resin composition.

2. Description of Related Art

At the present time, there is an ever-increasing demand for a reduction in the size and a reduction in the weight of electronic equipment, such as domestic electric appliances, telephones and CO equipment, and the use of plastics for housing of this equipment has been studied in the art.

In particular, note book size personal computers and word processors among the above-described types of portable CO equipment are required to have a reduced size and a reduced weight due to an increase in the range of use thereof.

This has caused the material for use in the portable equipment to become changed from metals to plastics, The plastics currently used in the art, however, cannot attain a satisfactory reduction in the weight, so that a further reduction in the weight is desired in the art.

ABS resins, AS resins, polycarbonate resins, modified polyphenylene ether resins, etc., have hitherto been studied as plastics for a housing from the viewpoint of a good moldability, a low cost and a good appearance in the form of finished articles. However, they are unsatisfactory in rigidity, so that no housing suitable for practical use has been provided in the art.

Further, in the housing for portable electronic equipment, the plate thickness should be as small as possible, and housing having a plate thickness of 3 to 5 mm and about 2 mm for a thin plate has been put to practical use.

The reduction in the plate thickness for the plastic housing to 2 mm or less unfavorably leads to the following problems.

(a) Rigidity

Since the conventional resins, such as ABS resin, has a low rigidity, if they, as such, are molded into molded articles having a small plate thickness, the molded articles are largely deformed upon being exposed to a small external force, so that they cannot protect contents of the housing, such as liquid crystal display panels comprising glass, printed circuit boards and keyboards.

(b) Fluidity during Molding

When a housing having a small thickness and a large area is molded, the resin is rapidly cooled in a mold, which increases the viscosity of the resin. This often causes the flow of the resin to stop, so that short molding occurs.

(c) Warpage

Even though short molding does not occur, the incoporation of a fibrous filler for the purpose of increasing the strength in addition to molding under high pressure gives rise to warpage due to the anisotropy of mold shrinkage derived from the orientation of the fiber.

(d) Impact Strength

In molded articles having a small plate thickness, an increase in the rigidity of the material for the purpose of preventing the deformation generally lowers the impact strength. In portable electronic equipment, such as note book size personal computers and word processors, there are occasions where accidental dropping occurs. The dropping often gives rise to crazing, cracking, etc. of the housing.

Since the specific gravity of the plastics is generally in the range of from 0.9 to 2.0, a further reduction in the weight through a reduction in the specific gravity cannot be expected. Therefore, a reduction in the plate thickness of the housing is necessary for a further reduction in the weight.

However, the molding of the conventional resin composition into a housing having a plate thickness of 2.0 mm or less leads to the above-described problems.

Japanese Unexamined Patent Publication (Kokai) No. 4-154864 discloses a polyamide resin composition comprising a polyamide resin, a modified polyphenylene ether resin, a carbon fiber and mica that is described as a material for a housing having a small plate thickness for portable equipment capable of overcoming the above-described problems of the prior art. However, also in this conventional composition, when molding of a molded article having a very small thickness of about 1 mm is intended, it is necessary to set the molding (resin) temperature at a high value close to the decomposition temperature of the resin, to provide many gates or to increase the runner diameter for the purpose of providing fluidity. This unfavorably gives rise to the occurrence of deterioration in the resin and defects of gas accumulation in the molded article. This has an adverse effect on the molded article and increases defective moldings and, hence, leads to an increase in the cost. Moreover, in the molding of a molded article having a very small thickness, since the injection pressure is higher than usual molding, particularly, warpage is unfavorably liable to occult.

On the other hand, liquid-crystalline polymers (thermotropic liquid-crystalline polymers) have a rigid molecular structure, form a liquid crystal in a molten state, are easily orientated by shear force applied during molding, exhibit a good fluidity during molding and can provide molded articles having a high strength, a high flexural strength, a high modulus of elasticity, an excellent impact resistance and a small coefficient of linear expansion.

An attempt has been made to modify non-liquid-crystalline polymers by taking advantage of the above-described properties of the liquid-crystalline polymers by blending the liquid-crystalline polymer with the non-liquid-crystalline polymer. For example, in Polymer Engineering & Science, 27, p. 410 (1987), C. Kiss et al. reports that blending of a liquid-crystalline polymer with conventional engineering plastics followed by molding causes the liquid-crystalline polymer to be dispersed in a fibril form in the non-liquid-crystalline polymer and the modulus of elasticity can be improved by virtue of the reinforcing effect of the liquid-crystalline polymer. In Plastic Engineering, p. 39 (1997), T. S. Chung reports that blending of a liquid-crystalline polymer with nylon 12 followed by molding provides a molded article having a small coefficient of linear expansion. Further, Japanese Unexamined Patent Publication (Kokai) No. 56-115357 discloses that the fluidity can be improved by blending a liquid-crystalline polymer with a non-liquid-crystalline polymer.

However, no attempt has been made to provide a molded article less susceptible to warpage often caused in molding of an article having a small thickness by enabling the molding resin temperature and the filling pressure during molding to be lowered by blending a liquid-crystalline polymer and a compatibilizing agent with a resin composition a polyamide resin containing a m-xylylene group, a modified polyphenylene ether resin, a carbon fiber, mica, a glass flake, etc., and further to apply the resultant molded article as a housing for electronic equipment, such as personal computers and word processors.

An object of the present invention is to overcome the above-described drawbacks of the prior art and to provide a molding resin composition for use as a housing material for a housing having a small plate thickness for portable equipment that is excellent in water resistance, chemical resistance, fluidity during molding, mechanical properties and rigidity and less liable to cause warpage, and a housing having an average plate thickness of 2 mm or less produced by molding this polyamide resin composition and for use in electronic equipment, such as personal computers and word processors.

SUMMARY OF THE INVENTION

As a result of extensive and intensive studies, the present inventors have found that a molding resin composition, which has well-balanced properties, that is, even in the case of molded articles having a small plate thickness, is excellent in chemical resistance, fluidity, mechanical properties and rigidity and less likely to cause warpage during molding, can be provided by adding a liquid-crystalline polymer to a resin composition comprising an aromatic polyamide resin and a modified polyphenylene ether resin and further incorporating, into the resin composition, inorganic fillers, such as a carbon fiber, mica and glass flake, which has led to the completion of the present invention.

Thus, the present invention provides a polyamide resin composition comprising 100 parts by weight of a resin composition comprised of 20 to 80% by weight of an aromatic polyamide resin and 80 to 20% by weight of a modified polyphenylene ether resin (the total amount in % by weight of the aromatic polyamide resin and the modified polyphenylene ether resin being 100% by weight) and, incorporated in said resin composition, 0.5 to 30 parts by weight of a liquid-crystalline polymer, 0.01 to 3 parts by weight of a compatibilizing agent and 2 to 40 parts by weight of an inorganic filler, and a housing for electronic equipment, comprising a molded product of said polyamide resin composition and having an average plate thickness of 2 mm or less.

DETAILED DESCRIPTION OF THE INVENTION

Examples of the aromatic polyamide resin used in the present invention include a polyamide resin containing a m-xylylene group (hereinafter referred to as "MX nylon" and a polyamide resin comprising an aromatic dicarboxylic acid and an aliphatic diamine or an alicyclic diamine. MX nylon is preferred from the viewpoint of a balance of the moldability, properties, etc.

MX nylon is a polyamide resin synthesized by polycondensing m-xylylenediamine or a diamine mixture comprising 60% by weight or more of m-xylylenediamine and 40% by weight or less of p-xylylenediamine with an α, ω-straight-chain aliphatic dibasic acid having 6 to 12 carbon atoms, for example, adipic acid, sebacic acid, suberic acid, undecanoic acid or dodecanoic diacid.

Among MX nylons, those synthesized by using adipic acid among the above-described α,ω-straight-chain aliphatic dibasic acids are particularly favorable from the viewpoint of a balance of moldability, properties, etc.

The polyphenylene ether resin used in the present invention has in its main chain a structural unit represented by the following general formula wherein $R_1$ represents a lower alkyl group having 1 to 3 carbon atoms and $R_2$ and $R_3$ represent a hydrogen atom or a lower alkyl group having 1 to 3 carbon atoms. The polyphenylene ether resin may be any of a homopolymer copolymer and a graft polymer.

Specific examples of the polyphenylene ether resin include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene) ether and poly(2-methyl-6-propyl-1,4-phenylene)ether, and poly(2,6-dimethyl-1,4-phenylene)ether and 2,6-dimethylphenol and 2,3,6-trimethylphenol copolymers and graft polymers comprising these polymers and styrene grafted thereon are particularly preferred.

The modified polyphenylene ether resin used in the present invention is produced by reacting a polyphenylene ether resin and an unsaturated aliphatic carboxylic acid or its acid anhydride with each other in a melt-mixed state in the absence of a catalyst or reacting a polyphenylene ether resin with an unsaturated aliphatic carboxylic acid or its acid anhydride in the presence of a catalyst.

When an acid anhydride of an unsaturated aliphatic carboxylic acid is used for the modification of the polyphenylene ether resin, the acid anhydride of the unsaturated aliphatic carboxylic acid and the polyphenylene ether resin are reacted with each other in a melt-mixed state in the absence of a catalyst to provide a modified polyphenylene ether resin.

In this case, although there is no particular limitation on the melt mixing method and use may be made of a kneader, a banbury mixer, an extruder, etc., the use of an extruder is preferred from the viewpoint of the operation.

Examples of the acid anhydride of the unsaturated aliphatic carboxylic acid include maleic anhydride, itaconic anhydride and citraconic anhydride. Among them, maleic anhydride is particularly preferred. The proportion of use of the above-described acid anhydride necessary for the modification of the polyphenylene ether resin is 0.01 to 10 parts by weight, preferably 0.1 to 1 part by weight, based on 100 parts by weight of the polyphenylene ether resin.

When the proportion of use of the above-described acid anhydride is less than 0.01 part by weight based on 100 parts of the polyphenylene ether resin, the effect of improving the compatibility of the polyphenylene ether resin with the mixed polyamide rein is so small that it is difficult to provide a tough composition.

On the other hand, when the proportion of use of the acid anhydride is 10 parts by weight or more based on 100 parts by weight of the polyphenylene ether resin, excess acid anhydride is heat-decomposed, which gives rise to problems unfavorable from a practical viewpoint, such as a lowering in heat resistance and poor appearance. When an unsaturated aliphatic carboxylic acid is used for the modification of the polyphenylene ether resin, if necessary, radical generators, such as benzoyl epoxide and dicumyl peroxide, may be used as a catalyst.

Although the proportion of incorporation of the modified polyphenylene ether resin relative to the polyamide resin mixture may be selected from a wide incorporation proportion range, the proportion of the modified polyphenylene ether resin is preferably 80 to 20% by weight in comparison with 20 to 80% by weight of the polyamide resin mixture. When the proportion of the modified polyphenylene ether resin exceeds 90 parts by weight in comparison with 20 parts by weight of the polyamide resin mixture, the fluidity is so poor that the moldability is lowered.

On the other hand, when the proportion of the modified polyphenylene ether resin is less than 20 parts by weight in comparison with 80 parts by weight of the polyamide resin mixture, the mold shrinkage derived from the crystallinity of the polyamide resin becomes so large that the warpage of the molded article cannot be sufficiently alleviated.

Specific examples of the liquid-crystalline polymer used in the present invention include a copolyester comprising p-hydroxybenzoic acid and ethylene terephthalate, a copolyester comprising 6-hydroxy-2-naphthoic acid and p-hydroxybenzoic acid, a copolyester comprising p-hydroxybenzoic acid, terephthalic acid and a dihydric phenol and a copolyester comprising phenylhydroquinone and styrohydroquinone. The liquid-crystalline polymers (thermotropic liquid-crystalline polymers) have a rigid molecular structure, form a liquid crystal in a molten state, are easily orientated by shear force applied during molding, exhibit a good fluidity during molding and can provide molded articles having a high strength, a high flexural strength, a high modulus of elasticity, an excellent impact resistance and a small coefficient of linear expansion.

In the present invention, a liquid-crystalline polymer is blended with a polyamide resin composition comprising a polyamide resin containing a m-xylylene group and a modified polyphenylene ether resin, and an inorganic filler comprising a carbon fiber, mica, a glass flake or the like is added thereto to provide a molding resin composition having an improved fluidity which enables the molding resin temperature and filling pressure to be lowered during molding, thereby providing a molded article less susceptible to warpage often caused during molding of an article having a small thickness that is used as a housing for electronic equipment, such as personal computers and word processors.

It is preferred for the liquid-crystalline polymer used in the present invention to be melt-moldable and have a melting point of 200° to 300° C. The reason for this is that the resin composition comprising a polyamide resin mixture and a modified polyphenylene ether resin has a melting point of about 240° C. and no useful blend can be provided if the kneading temperature does not overlap with the molding temperature.

The amount of addition of the liquid-crystalline polymer is preferably in the range of from 0.5 to 30 parts by weight based on 100 parts by weight of the resin composition comprising a polyamide resin containing a m-xylylene group and a modified polyphenylene ether. The reason for this is as follows. When the amount of the liquid-crystalline polymer is 0.5 parts by weight or less, no significant improvement in the blend can be attained, so that the molding resin temperature and filling pressure cannot be lowered, which makes it difficult to provide a molded article less susceptible to warpage. On the other hand, when the amount of the liquid-crystalline polymer is 30 parts by weight or more, the orientation and anisotropy of the liquid-crystalline polymer per se become so large that problems of an increase in the warpage and a lowering in the strength of weld lines occur.

When nylon and a liquid-crystalline polymer (LCP) are blended with each other, it is preferred to use a reacting agent (a compatibilizing agent) for both substances. This enhances the compatibility of both the substances, which contributes to an improvement in the mechanical strength of the molded article. Representative examples of the reacting agent for the LCP-nylon system known in the art include phenylenebisoxazoline (PBO) compounds described in Japanese Unexamined Patent Publication (Kokai) No. 3-215548. The PBO is useful for LCP having a terminal carboxyl group (for example, LC-5000 manufactured by Unitika Ltd.). The above-described reacting agents are added in an amount of about 0.01 to 3 parts by weight, preferably 0.1 to 0.5 part by weight, based on 100 parts by weight of the resin. This is because when the amount of addition is less than 0.01 part by weight, no effect can be attained by the addition of the reacting agent while when the amount of addition exceeds 3 parts by weight, a problem of an increase in the viscosity or the like due to the presence of the reacting agent in an excessive amount occurs.

In the resin composition of the present invention, 2 to 40 parts by weight of an inorganic filler, such as a glass fiber, a glass bead, glass flake, a carbon fiber, mica and various minerals, is used as a reinforcing material. The inorganic filler is preferably a carbon fiber from the viewpoint of reducing the weight and increasing the strength, and scaly mica, a glass flake or the like from the viewpoint of preventing warpage.

The carbon fiber is not particularly limited as long as it can be used as a reinforcing material for the resin and may be either of roving and chopped strands. In general, the carbon fiber preferably has a fiber length of 0.1 to 25 mm, preferably 1 to 6 mm, and an average fiber diameter of 7 to 20 μm. When the fiber length is excessively large, the degree of warpage deformation of the molded article becomes large, while when the fiber length is small, the reinforcing effect for the strength and rigidity is poor. Although the above-described carbon fiber may have an untreated surface or a surface subjected to a treatment with a coupling agent, such as a silane coupling agent or a titanate coupling agent, the carbon fiber treated with a coupling agent is preferred. The carbon fiber may be any of a carbon fiber derived from PAN and a carbon fiber derived from pitch.

The amount of incorporation of the carbon fiber used in the present invention is 2 to 30 parts by weight based on 100 parts by weight of the resin composition comprising a polyamide resin composition, a modified polyphenylene ether resin and a liquid-crystalline polymer. This is because when the amount of incorporation of the carbon fiber is less than 2 parts by weight, the reinforcing effect for the strength and rigidity is small, while when it exceeds 30 parts by weight, the production of the composition is hindered, so that the fluidity lowers during molding, which makes it difficult to mold an article having a small plate thickness.

Since the mica and glass flake used in the present invention is in the form of a foil or a scale, they are effective for preventing the warpage deformation of the molded article and further effective for enhancing the rigidity of the material composition. The average particle diameter of the mica or glass flake used in the present invention is 150 μm or less, preferably 80 μm or less.

As with the carbon fiber, the mica or glass fiber used in the present invention preferably has a surface subjected to a treatment with various coupling agent. The proportion of incorporation of the glass flake or carbon fiber is 2 to 30 parts by weigh based on 100 parts by weight of the resin composition comprising a polyamide resin, a modified polyphenylene ether resin and a liquid-crystalline polymer.

The reason for this is as follows. When the amount of incorporation of the mica or glass fiber is less than 2 parts by weight, neither the effect of improving the rigidity nor the effect of preventing the warpage can be attained. On the other hand, when it exceeds 30 parts by weight, the fluidity during molding becomes so low that it becomes difficult to mold an article having a small plate thickness. It is noted that the total amount of addition of the carbon fiber and mica or the total amount of addition of the carbon fiber and glass flake should not exceed 40 parts by weight.

The specific gravity of the resin composition according to the present invention is preferably 1.35 or less, preferably 1.30 or less. The resin composition of the present invention is used mainly for reducing the weight of the housing. When the specific gravity exceeds 1.35, the weight of the product increases, which renders the resin composition unsuitable for the practical use.

The elastic modulus in flexure of the molded article provided by molding the polyamide resin composition according to the present invention is preferably 100,000 kgf/cm$^2$ or more, still preferably 120,000 kgf/cm$^2$ or more. When the elastic modulus in flexure is less than 100,000 kgf/cm$^2$, the deflection of the molded article under load becomes so large that it often becomes difficult to provide an intended molded article having a small plate thickness and a high strength.

The fluidity of the resin composition according to the present invention is 120 mm or more, preferably 150 mm or more in terms of a bar flow length as measured at a resin temperature of 270° C., a mold temperature of 120° C. and an injection pressure of 1600 kgf/cm$^2$ using a cavity having a depth of 1 mm and a width of 10 mm.

When the bar flow length is smaller than 120 mm, short shot occurs, or even though the filling can be successfully conducted, the filling pressure becomes so high that the appearance of the molded article becomes poor due to the occurrence of warpage or the like, which makes it difficult to effect molding of an intended article having a reduced plate thickness and a reduced weight.

In order to improve the impact resistance of the polyamide resin composition according to the present invention, it is possible to incorporate a rubber component, such as a polybutadiene/styrene copolymer, a polybutadiene/acrylonitrile copolymer, a polybutadiene/acrylonitrile/styrene copolymer, a polystyrene/ethylene/butylene copolymer or an ethylene/propylene copolymer.

Since, however, the addition of the rubber component lowers the rigidity, the proportion of the rubber component is preferably 10 parts by weight, and more preferably 5 parts by weight, based on 100 parts by weight of the polyamide resin composition according to the present invention.

Further, glass fibers, potassium titanate fibers or whiskers of zinc oxide and the like may be incorporated in the polyamide resin composition of the present invention. Since, however, the incorporation of these materials gives rise to an increase in the specific gravity, the tolerance of the materials is 10% by weight or less and the total amount of the inorganic fillers should not exceed 40% of the polyamide resin composition.

Further, if necessary, various additives, for example, stabilizers, dyes, pigments, release materials, fillers and flame retardants, may be properly incorporated in the polyamide resin composition of the present invention. The resin composition of the present invention can be produced by melt-mixing using the conventional single-screw or twin-screw extruder.

The molded article of the present invention can be subjected to electroless plating by any conventional method used as a measure against EMI.

Materials for a housing having a small plate thickness suitable for portable equipment include aromatic polyamide/ modified polyphenylene ether alloys. However, in order to mold a housing having a small plate thickness and a large area, the filling pressure and molding resin temperature should be increased to forcibly pour the resin into the mold. This has given rise to large problems such as short shot or warpage of the molded article and a deterioration of the resin.

In the present invention, a liquid-crystalline polymer is blended with an aromatic polyamide/modified polyphenylene ether system, and a compatibilizing agent, a carbon fiber, mica and a glass flake are further added thereto to improve the fluidity and other property of the resin, which enables the resin temperature and filling pressure during molding to be improved, so that it becomes possible to provide a molded article less liable to cause warpage. Since this molded article is characterized by a small plate thickness, a high strength and a less liability to cause warpage, it can be applied as a housing for electronic equipment for personal computers, word processors, etc.

A reduction in the size and a reduction in the weight of domestic electric appliances, toys, telephones and OA equipment can be attained by using the polyamide resin composition of the present invention.

In particular, when the resin composition of the present invention is applied to the housing for note book size and very small size personal computers and word processors, which are portable OA equipment, the plate thickness can be reduced to 2.0 mm or less and even further to 1 mm or less, which contributes to a significant reduction in the size and weight of the OA equipment.

EXAMPLES

The present invention will now be described in more detail with reference to the following Examples. Evaluation was effected by the following methods.

(1) Specific gravity: ASTM D792
(2) Flexural strength: ASTM D790
(3) Elastic modulus in flexure: ASTM D790
(4) Izod impact strength: ASTM D256 (¼ in., notched)
(5) Heat distortion temperature: ASTM D648

(6) Flow length:

The fluidity (bar flow length) was measured by molding using a mold (temperature: 120° C.) having a width of 10 mm and a thickness of 1 mm under an injection pressure of 1600 kgf/cm$^2$.

(7) Moldability:

A cover molding as shown in FIGS. 1A to 1E for a liquid crystal display portion (hereinafter referred to as "LCD cover") of a note book size personal computer and a bottom cover as shown in FIGS. 2A to 2E for a housing for a very small size personal computer were molded to evaluate the moldability. The injection molding was effected by using a four-point gate.

The LCD cover shown in FIGS. 1A to 1E has a dimension of L (length)=295 mm, W (width)=170 mm, H (height)=6 mm, $T_0$ (plate thickness on the whole)=1 mm and $T_1$ (plate thickness in part)=2 mm. The bottom cover of the housing for a small size personal computer as shown in FIGS. 2A to 2E has a dimension of 1 (length)=210 mm, w (width)=149 mm, h (height)=12 mm, t (plate thickness)=0.8 mm. Four gates G are provided on the back of the box.

Figure 1A:
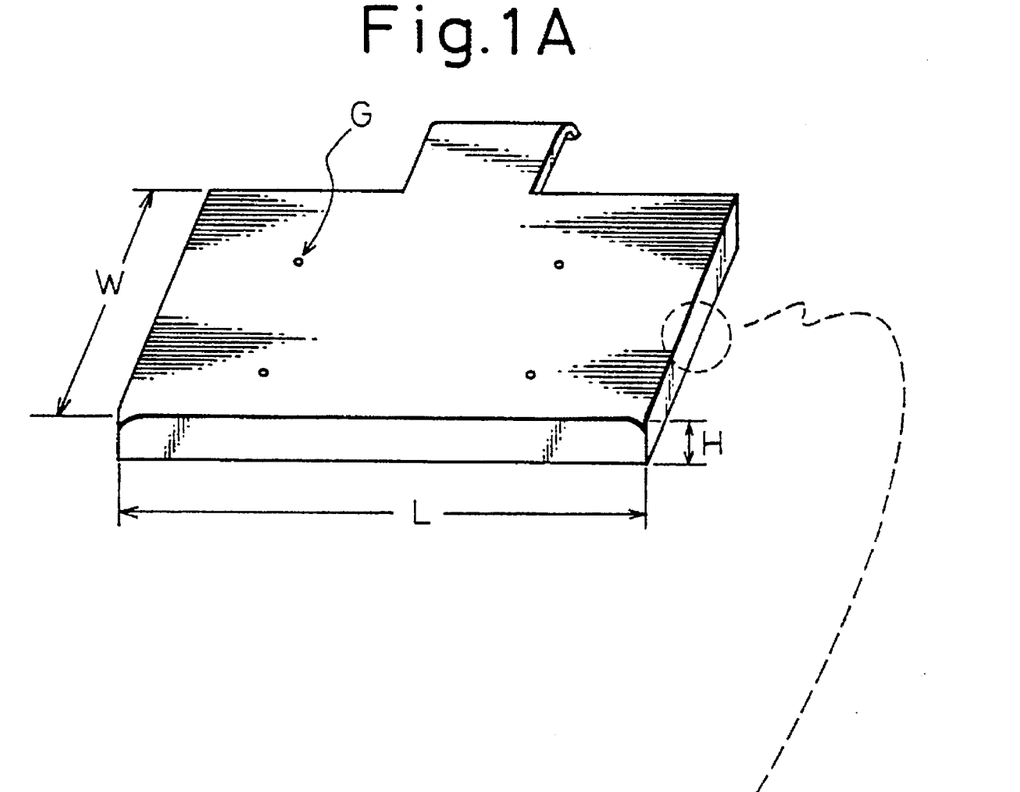
FIG. 1A is perspective view of a LCD cover prepared in an example and FIG. 1B is a cross-sectional view of a part of the LCD cover.
Figure 1B:
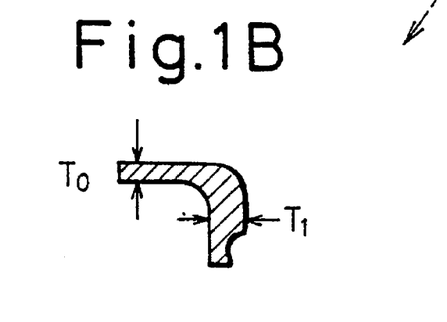
Figures 1C, 1D:
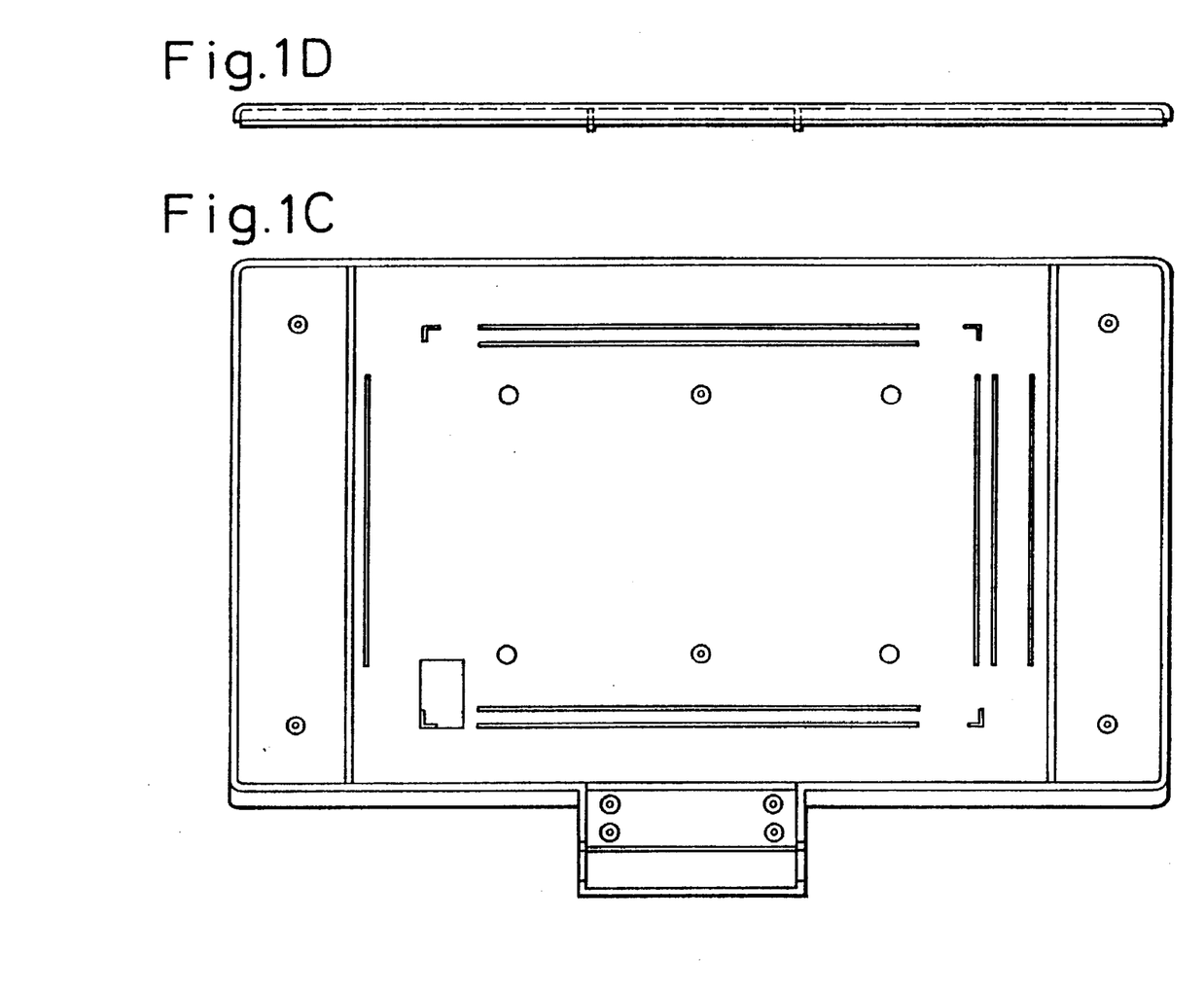
FIGS. 1C to 1E are precise rear, front and side views of the LCD cover.
Figure 1E:
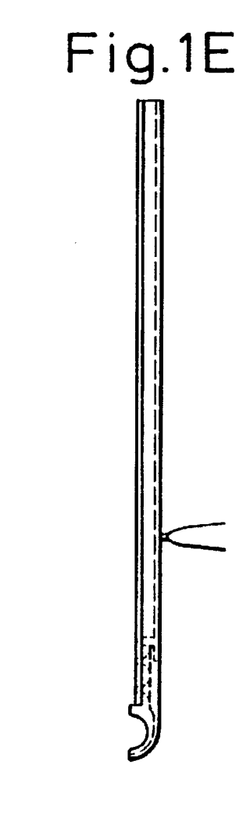
Figure 2A:
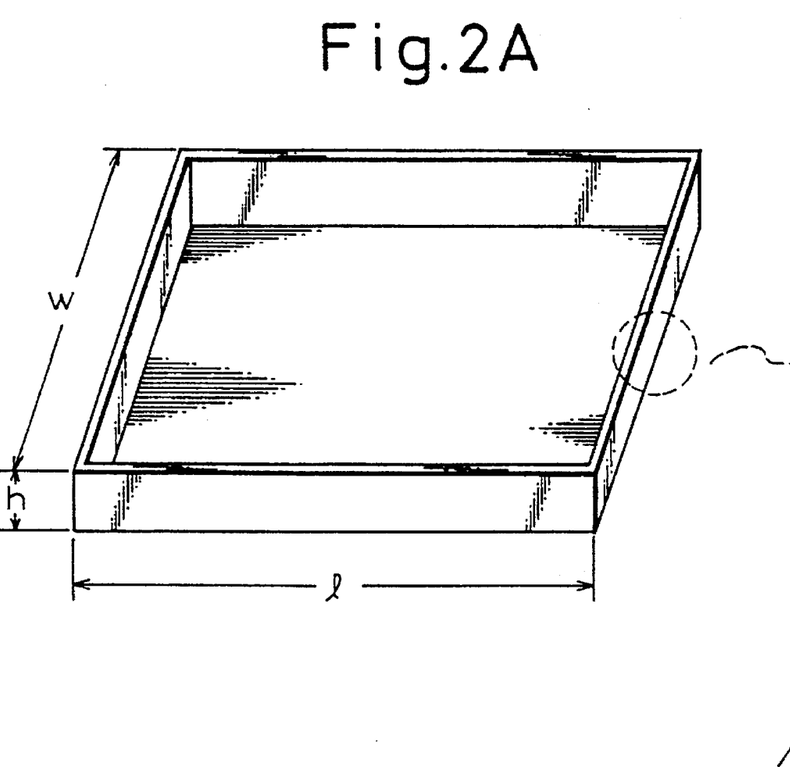
FIG. 2A is a perspective view of a bottom cover of a housing for a very small size personal computer prepared in another example and FIG. 2B is a cross-sectional view of a part of the housing.
Figure 2B:
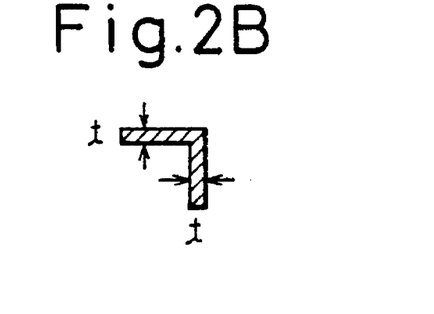
Figures 2C, 2D:
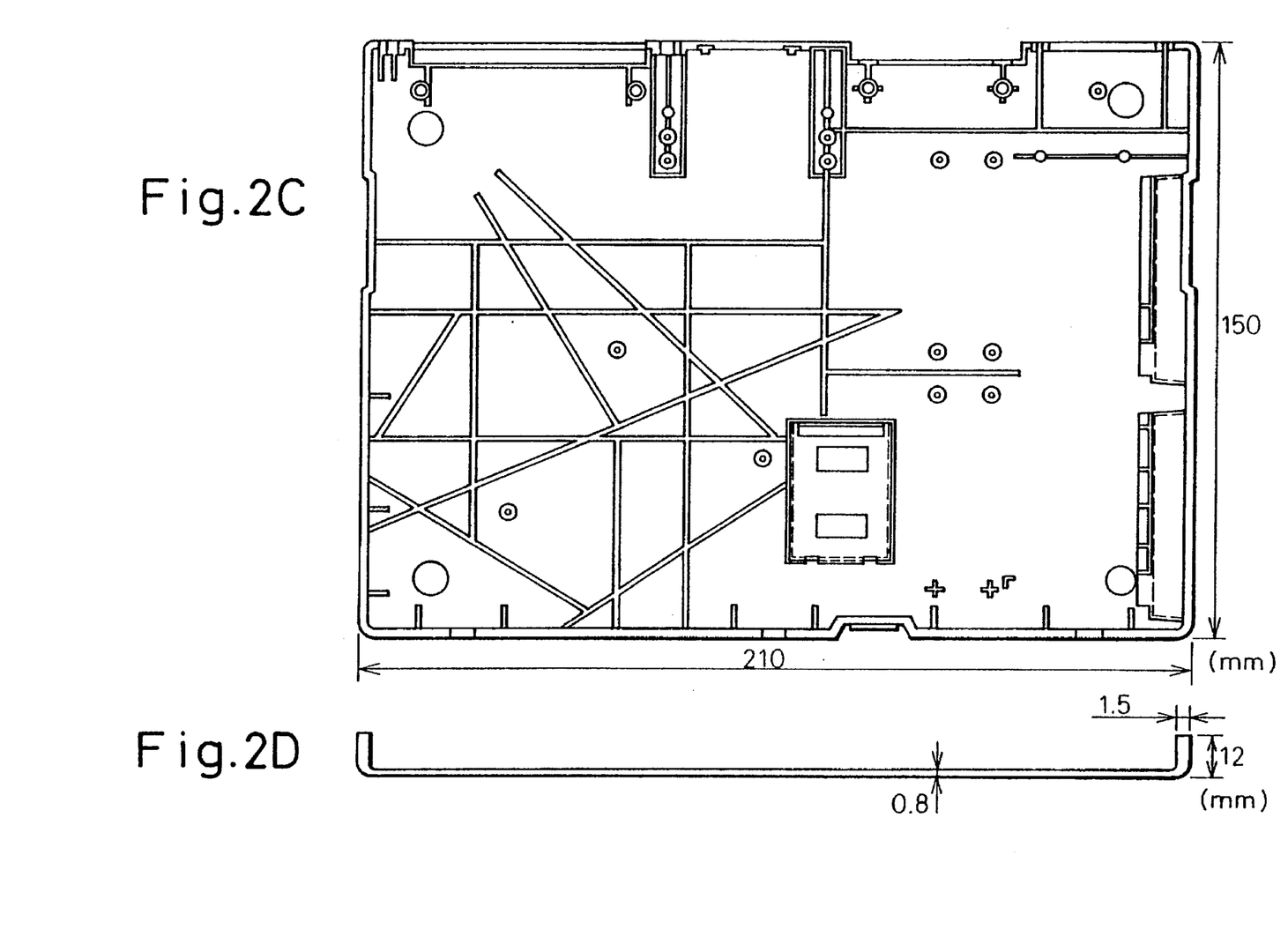
FIGS. 2C and 2C are precise top and cross-sectional views of the housing.
Figure 3:
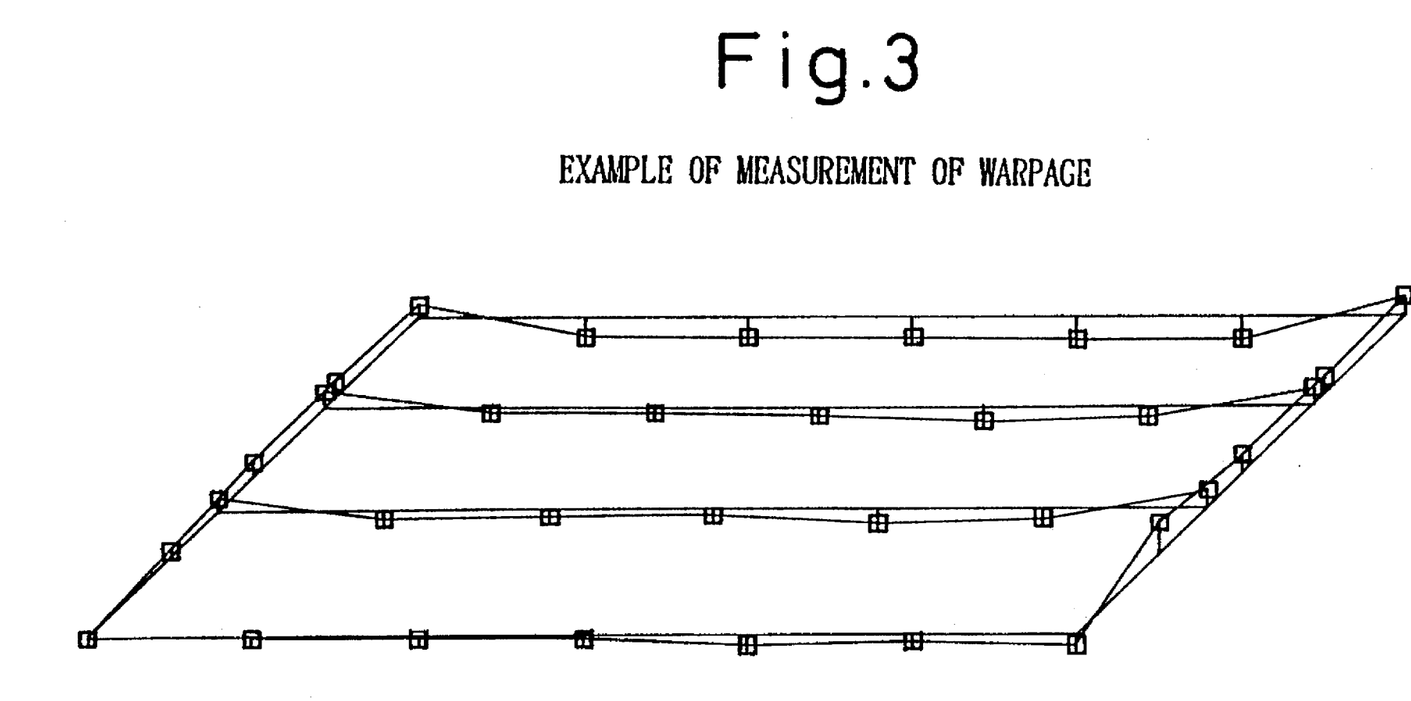
FIG. 3 is an example of the results of measurement of warpage of the molded article.

(8) Warpage: The molded articles shown in FIGS. 1 and 2 were subjected to the measurement of flatness with a three-dimensional measuring device 24 hr after the completion of the molding. In any case, the number of points of measurement was 38 (7 points for each of 4 longitudinal lines and 5 points for each of 2 transverse lines) in plane. An example of the measurement is shown in FIG. 3.

EXAMPLE 1

100 parts by weight of a polyphenylene ether resin represented by the following formula where n is about 100, was heat-melted and mixed with 1 part by weight of maleic anhydride to provide a maleic-anhydride-modified polyphenylene ether resin (hereinafter referred to as "maleic-anhydride-modified PPE"). Since the modified resin is non-crystalline, although it has no clear melting point, it becomes melted at 240° to 250° C. The maleic anhydride serves as an agent for compatibilizing nylon with the polyphenylene ether resin.

Poly-m-xyleneadipamide having a number average molecular weight of 16,000 produced by polycondensing m-xylenediamine with adipic acid (hereinafter referred to as "nylon MXD6") has a structure represented by the following formula and a melting point of 243° C.:

50 parts by weight of the maleic-anhydride-modified PPE, 50 parts by weight of nylon MXD6, 7 parts by weight of a liquid-crystalline polyester pellet (LC-5000 manufactured by Unitika Ltd.; hereinafter referred to as "LCP") comprising 80% by mole of a p-hydroxybenzoic acid residue unit and 20% by mole of an ethylene terephthalate unit, 3 parts by weight of 1,3-phenylenebisoxazoline (PBO) as a reacting agent for nylon and LCP, 10 parts by weight of a carbon fiber (Pyrofil TR06NB manufactured by Mitsubishi Rayon Co., Ltd.) and 10 parts by weight of mica (Y300D manufactured by Takara & Co., Ltd.) were dry-blended with each other, and a melt-kneaded resin composition was produced by using an extruder set at 280° C. The formation of the resin composition is shown in Table 1.

The resultant resin composition was molded by an injection molding machine into a test piece specified in ASTM and evaluated. Further, the evaluation of the fluidity and the evaluation of the molding of a LCD cover shown in FIG. 1 for a personal computer were effected. The results of evaluation are given in Table 1. As a result, a LCD cover having a plate thickness of 1 mm and an elastic modulus in flexure as high as 120,000 could be easily molded with a four-point gate at a resin temperature of 270° C. and a filling pressure of 1400 kg/cm$^2$, and the warpage could be reduced to 1 mm or less.

An example of the measurement of warpage is shown in FIG. 3. The measurement was effected for each point of 24 mm×14 min. The maximum value, minimum value and warpage (flatness) were respectively 0.4140 mm, −0.5602 mm and 0.9742 mm based on the reference value.

EXAMPLE 2

A maleic-anhydride-modified PPE containing a rubber was produced in the same manner as that used in the production of maleic-acid-modified PPE described in Example 1, except that 5 parts by weight of a polystyrene/ethylene/butyrene block copolymer (Kraton G1650 manufactured by Shell Kagaku K. K.) was blended as a rubber component based on 45 parts by weight of PPE. A resin composition was produced in the same manner as that of Example 1, except that use was made of the maleic-anhydride-modified PPE containing a rubber and polyamide 66. The results are given in Table 1.

The resultant resin composition was molded and evaluated in the same manner as that of Example 1. As a result, as with Example 1, a LCD cover having a high elastic modulus in flexure, a reduced warpage and a high impact strength could be provided at low resin temperature and filling pressure.

EXAMPLE 3

A resin composition was produced according to the same formulation as that of Example 2, except that a glass flake (REF-15A manufactured by Nippon Sheet Glass Co., Ltd.) was used instead of mica used in Example 1. The results are given in Table 1. The resin composition could provide a molded article having properties substantially equivalent to that of Example 2.

EXAMPLES 4 and 5

The same maleic-anhydride-modified PPE, nylon MXD6, polyamide 66, LCP, PBO (0.3 part), a carbon fiber, mica and a glass flake as those used in Example 2 and 3 in a weight ratio specified in the table were placed in a tumbler and dry-blended with each other, and resin compositions were produced in the same manner as that of Example 1.

Evaluation of molding was effected in the same manner as that of Example 1. The results are given in Table 1. All the samples had a good moldability, a high elastic modulus in flexure and a warpage of 1 mm or less during molding which were satisfactory from a practical viewpoint.

EXAMPLE 6

A bottom cover of a very small size personal computer box having a plate thickness of 0.8 mm shown in FIG. 2 was molded using the same composition as that of Example 1 in the same manner as that of Example 1 at a resin temperature of 270° C. and a filling pressure of 1420 kgf/cm$^2$.

As a result, the moldability was good, and the warpage was as small as 0.4 mm.

EXAMPLE 7

A bottom cover was molded using the same composition as that of Example 2 in the same manner as that of Example 6.

As a result, as with Example 6, a good molded article having a reduced warpage could be provided.

COMPARATIVE EXAMPLE 1

The preparation of a composition, molding and evaluation were effected in the same formulation and manner as those of Example 1, except that no use was made of liquid-crystalline polymer.

The results are given in Table 2. In the case of a resin temperature of 270° C., short shot occurred even when the filling pressure was increased to 2400 kgf/cm$^2$, so that no LCD cover could be molded.

COMPARATIVE EXAMPLE 2

The preparation of a composition, molding and evaluation were effected in the same formulation and manner as those of Comparative Example 1, except that the resin temperature was 305° C.

The results are given in Table 2. The fluidity became good by an increase in the resin temperature and could be molded into a LCD cover. However, the warpage was as large as 3.5 mm. Further, a deterioration in the resin and gas burning at an ultimate resin arrival point were observed.

Figure 4:
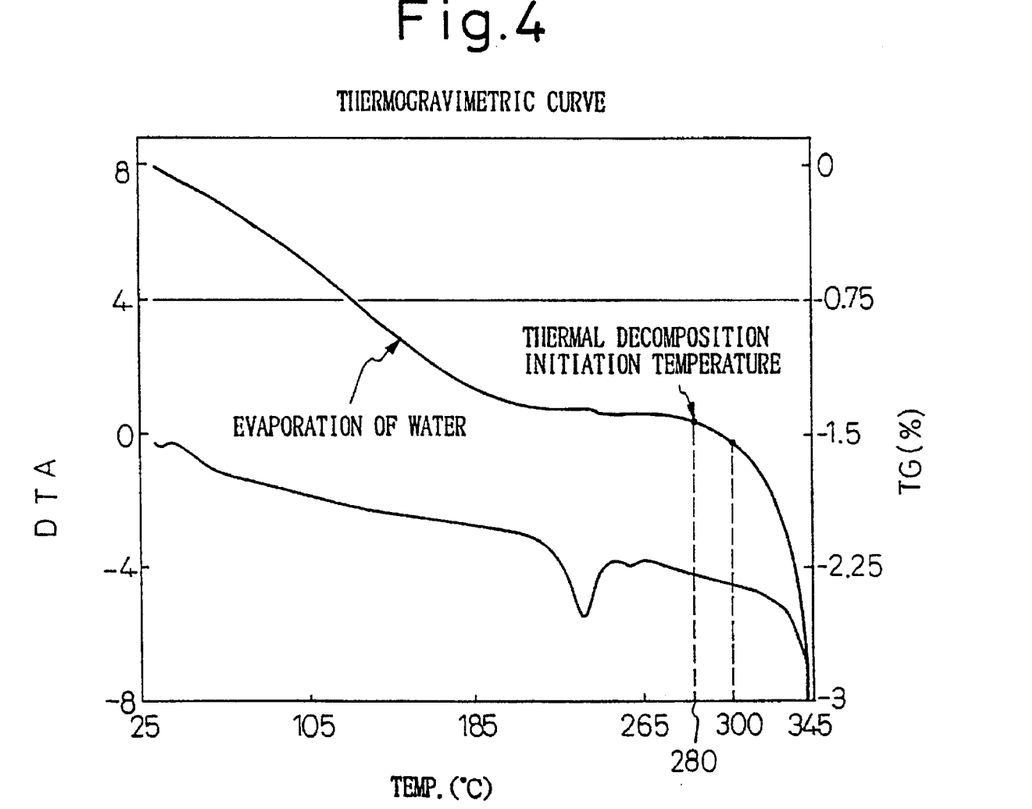
FIG. 4 is a thermogravimetric curve of a polyamide resin composition.

FIG. 4 is a thermogravimetric curve (in the air, temperature rise rate: 10° C./min) of the composition of Example 1. As can be seen from FIG. 4, the reduction in the weight due to the thermal decomposition became large at a temperature of 280° C. or above. From this, it can be said that the thermal decomposition initiation temperature is about 280° C. and the molding temperature is preferably 300° C. or below, still preferably 270° C. or below.

COMPARATIVE EXAMPLES 3, 4, 5 and 6

The preparation of test pieces, molding and evaluation were effected using the same nylon MXD6, modified PPE, liquid crystalline polymer, PBO, carbon fiber and mica as those used in Example 1 according to the formulations specified in Table 2 in the same manner as that of Example 1. The results are given in Table 2.

In Comparative Example 3, the content of the carbon fiber is so low that the rigidity is insufficient. In Comparative Example 4, since the amount of addition of the mica is so insufficient, the warpage of the LCD cover was 2.5 mm. In Comparative Example 5, since the amount of addition of the liquid-crystalline polymer was so small, no improvement in the fluidity could be attained. In Comparative Example 6, since the amount of addition of the liquid-crystalline polymer was so large, warpage became liable to occur.

COMPARATIVE EXAMPLE 7

The preparation of a composition, molding and evaluation were effected in the same formulation and manner as those of Example 6, except that no use was made of liquid-crystalline polymer.

The results are given in Table 2. In the case of a resin temperature of 270° C., short shot occurred even when the filling pressure was increased to 2400 kgf/cm$^2$, so that no bottom cover could be molded.

COMPARATIVE EXAMPLE 8

The preparation of a composition, molding and evaluation were effected in the same formulation and manner as those of Example 1, except that use was made of no PBO as the reacting agent. The results are given in Table 2. When the composition did not contain PBO, the flexural strength, elastic modulus in flexure and impact strength lowered.

TABLE 1

| Ex. No. | 1 | 2 | 3 | 4 | 5 | 6 | 7 |
|---|---|---|---|---|---|---|---|
| Material composition (pt. wt.) | | | (Part 1) | | | | |
| Nylon MXD6 | 50 | 40 | 40 | 45 | 45 | 50 | 40 |
| Polyamide 66 | — | 10 | 10 | 5 | 5 | — | 10 |
| Modified PPE | 50 | 45 | 45 | 45 | 45 | 50 | 45 |
| Liquid-crystalline polymer | 7 | 7 | 7 | 5 | 10 | 7 | 7 |
| PBO | 0.3 | 0.3 | 0.3 | 0.3 | 0.3 | 0.3 | 0.3 |
| Carbon fiber | 10 | 10 | 10 | 10 | 10 | 10 | 10 |
| Mica | 10 | 10 | — | 10 | 10 | 10 | 10 |
| Glass flake | — | — | 10 | — | — | — | — |
| Rubber | — | 5 | 5 | 5 | 5 | — | 5 |
| Specific gravity | 1.24 | 1.24 | 1.23 | 1.23 | 1.26 | | |
| Flexural strength (kgf/cm$^2$) | 2200 | 2200 | 2200 | 2250 | 2300 | | |

TABLE 1-continued (Part 2)

| Examples No. | 1 | 2 | 3 | 4 | 5 | 6 | 7 |
|---|---|---|---|---|---|---|---|
| Elastic modulus in flexure ($10^3$ kgf/cm$^2$) | 120 | 110 | 110 | 115 | 120 | | |
| Izod impact strength (kgfcm/cm) | 3.0 | 4.2 | 4.3 | 4.1 | 4.0 | | |
| Thermal deformation temp. (°C.) | 215 | 210 | 210 | 215 | 215 | | |
| Moldability | Good | Good | Good | Good | Good | Good | Good |
| Filling peak pressure (kgf/cm$^2$) | 1400 | 1420 | 1400 | 1450 | 1200 | | |
| Flow length (mm) | 410 | 400 | 400 | 350 | 460 | | |
| Warpage (mm) | 0.6 | 0.6 | 0.5 | 0.6 | 0.5 | 0.4 | 0.3 |
| Remarks (Molding Temp., °C.) | LCD cover 270° C. | LCD cover 270° C. | LCD cover 270° C. | LCD cover 270° C. | LCD cover 270° C. | Bottom cover 270° C. | Bottom cover 270° C. |

TABLE 2

| Comp. Ex. No. | 1 | 2 | 3 | 4 | 5 | 6 | 7 | 8 |
|---|---|---|---|---|---|---|---|---|
| (Part 1) | | | | | | | | |
| Material composition (pt. wt.) | | | | | | | | |
| Nylon MXD6 | 50 | 50 | 50 | 50 | 40 | 40 | 50 | 50 |
| Polyamide 66 | — | — | — | — | 10 | 10 | — | — |
| Modified PPE | 50 | 50 | 50 | 50 | 45 | 45 | 50 | 50 |
| Liquid-crystalline polymer | — | — | 7 | 7 | — | 35 | — | 7 |
| PBO | 0.3 | 0.3 | 0.3 | 0.3 | 0.3 | 0.3 | 0.3 | — |
| Carbon fiber | 10 | 10 | — | 10 | 10 | 10 | 10 | 10 |
| Mica | 10 | 10 | 10 | — | 10 | 10 | 10 | 10 |
| Glass flake | — | — | — | — | — | — | — | — |
| Rubber | — | — | — | — | 5 | 5 | — | — |
| Specific gravity | 1.24 | 1.24 | 1.23 | 1.20 | 1.23 | 1.24 | | 1.24 |
| Flexural strength (kgf/cm$^2$) | 2200 | 2200 | 800 | 1900 | 2250 | 2180 | | 1900 |
| (Part 2) | | | | | | | | |
| Elastic modulus in flexure ($10^3$ kgf/cm$^2$) | 120 | 120 | 50 | 90 | 120 | 105 | | 100 |
| Izod impact strength (kgfcm/cm) | 3.0 | 3.0 | 5.5 | 3.3 | 4.1 | 4.2 | | 2.5 |
| Thermal deformation temp. (°C.) | 215 | 215 | 200 | 205 | 215 | 210 | | 200 |
| Moldability | Short shot | Gas burning, resin deterioration | Good | Large warpage | Short shot | Large warpage | Short shot | Good |
| Filling peak pressure (kgf/cm$^2$) | 2400 | 2400 | 1400 | 1400 | 2400 | 900 | 2400 | 1350 |
| Flow length (mm) | 220 | 290 | 420 | 420 | 220 | 550 | | 440 |
| Warpage (mm) | — | 2.3 | 1.0 | 2.5 | — | 3.1 | | 0.6 |
| Remarks (Molding temp., °C.) | LCD cover 270° C. | LCD cover 305° C. | LCD cover 270° C. | LCD cover 270° C. | LCD cover 270° C. | LCD cover 270° C. | Bottom cover 270° C. | LCD cover 270° C. |

We claim:

1. A housing for electronic equipment, comprising a molded product of a polyamide resin composition and having an average plate thickness of 2 mm or less, the polyamide resin composition comprising 100 parts by weight of a resin composition comprised of 20 to 80% by weight of an aromatic polyamide resin and 80 to 20% by weight of a modified polyphenylene ether resin (the total amount in % by weight of the aromatic polyamide resin and the modified polyphenylene ether resin being 100% by weight) and, incorporated in said resin composition, based on 100 parts by weight of the resin composition, 0.5 to 30 parts by weight of a copolyester liquid-crystalline polymer, 0.01 to 3 parts by weight of phenylenebisoxazoline and 2 to 40 parts weight of an inorganic filler, the modified polyphenylene ether resin being produced by reacting a polyphenylene ether resin with an unsaturated aliphatic carboxylic acid or its acid anhydride.

2. The housing according to claim 1, wherein said polyamide resin is a polyamide resin containing a m-xylylene group.

3. The housing according to claim 1, wherein said copolyester liquid-crystalline polymer has a melting point of 200° to 300° C.

4. The housing according to claim 2, wherein said polyamide resin containing a m-xylylene group is a product of a polycondensation of m-xylylenediamine with adipic acid.

5. The housing according to claim 1, which further comprises 10 parts by weight or less, based on 100 parts by weight of the polyamide resin composition, of a rubber component.

6. The housing according to claim 1, wherein the polyamide resin composition has a fluidity of 120 mm or more in terms of a bar flow length (as measured at a resin temperature of 270° C. and an injection pressure of 1600 kgf/cm$^2$) using a cavity having a depth of 1 mm and a width of 10 mm and provides a molded product having a flexural strength of 100,000 kgf/cm$^2$ or more and a specific gravity of 1.35 or less.

7. The housing according to claim 5, wherein the rubber component is selected from the group consisting of a polybutadiene/styrene copolymer, a polybutadiene/acrylonitrile copolymer, a polybutadiene/acrylonitrile/styrene copolymer, a polystyrene/ethylene/butylene copolymer and an ethylene/propylene copolymer.

* * * * *